United States Patent [19]

Harr, Jr.

[11] 3,895,812

[45] July 22, 1975

[54] BI-METALLIC SEAL

[76] Inventor: Hugh Harr, Jr., High Point Farm, Newtown, Pa. 18940

[22] Filed: Jan. 21, 1974

[21] Appl. No.: 435,195

[52] U.S. Cl. .................... 277/32; 34/243; 105/424
[51] Int. Cl. ............................................. F16j 15/08
[58] Field of Search ............. 277/1, 26, 32; 34/242; 105/424

[56] References Cited
UNITED STATES PATENTS

| | | | |
|---|---|---|---|
| 1,762,667 | 10/1930 | Sanford et al. | 105/424 |
| 2,461,754 | 2/1949 | Mertz | 34/242 |
| 2,602,402 | 7/1952 | Sanford et al. | 105/424 |
| 2,615,761 | 10/1952 | Skinner | 277/32 |
| 2,783,295 | 2/1957 | Ewing | 277/32 |
| 3,300,874 | 1/1967 | Green et al. | 34/242 |

Primary Examiner—Robert I. Smith

[57] ABSTRACT

A seal between adjacent members suitable for high temperature applications, which includes an elongated strip of bi-metallic construction. The strip has one free edge and one fixed edge and is secured along the fixed edge thereof to the first of the members in a manner to allow the free edge to move away from the first member upon application of elevated temperatures. The free edge moves sufficiently to contact the second member and seals thereagainst. The system is designed to supply greater sealing forces between the first and second members as the temperature differential increases.

4 Claims, 7 Drawing Figures

PATENTED JUL 22 1975   3,895,812

SHEET 1

BI-METALLIC SEAL

BACKGROUND OF THE INVENTION

The present invention relates generally to the field of seals, and more particularly is directed to a bi-metallic seal to close an elongated space between two members.

A problem has long existed in the ceramic industry in sealing the transverse junction between cars in those installations wherein kiln cars are employed to carry ceramic materials through kiln tunnels for the firing of the ceramic materials. It is presently the common practice to provide rails within the tunnel by applying inwardly directed forces against the outermost cars, thereby moving the entire string through the kiln tunnel. When the material is fully processed, additional cars are added to the chain of cars and forces are applied to push the forwardmost car out of the kiln. In order to stop air flow between adjacent cars and to prevent passage of heat between cars, prior workers in the field have employed various sealing techniques such as carefully machining the forward and rearward ends of the cars so when the end surfaces meet, a relatively tight joint is formed to minimize the leakage therethrough. Of course, in such a butt type of joint, the seal is imperfect at best. Other workers in the art have machined the trailing end of each kiln car to provide the transverse, horizontal groove and have provided a transversely positioned asbestos rope on the leading end of the car in alignment with the groove. Thus, when the cars are pushed together for introduction into the kiln tunnel, the asbestos rope at one car end seats within the transverse groove at the other end of the next adjacent car to provide a relatively efficient seal. However, due to the inherent weakness in an asbestos rope, this type of construction was always subject to wear, damage and deterioration, all of which results in high maintenance costs. Also, more recently, kiln cars are being designed and fabricated of greater width which thereby makes the maintaining of a good seal even more difficult due to the changing car dimensions caused by expansion due to the heat within the kiln.

It is a common practice to construct the kiln cars of structural steel frames which are mounted on wheels for movement along the tracks positioned within the kiln tunnels. The structural steel frames and wheels are normally protected with a refractory deck to prevent the direct application of kiln heat which could be in the neighborhood of 1,700°F. to 2,400°F. from impinging directly upon the steel frame. The refractory decks were adequate to protect the medial portions of the car frames, but have proved deficient in protecting the leading and trailing edges of the cars.

SUMMARY OF THE INVENTION

The present invention relates generally to the field of bi-metallic seals, and more particularly, is directed to a bi-metallic seal that is responsive to changes in temperature to seal the junction between adjacent members.

The present invention includes an elongate strip of bi-metal construction wherein two metals having different coefficients of expansion, for example, nickel and chromium, are molecularly bonded together. The elongate strip includes a fixed edge such as the top edge which is suitably provided with fastener openings to secure the fixed edge to the surface of a first member. The other edge such as the bottom edge of the seal is maintained as a free edge and in initial position at the initial temperature, the free edge is normally maintained in a position near the first surface. Upon introducing the bi-metallic seal and the first member into an atmosphere which is maintained at a temperature considerably above or below the initial temperature, the expansion or contraction of the metals comprising the bi-metallic seal flexes the free edge away from the first surface and into tight engagement with a second surface. The greater the temperature differential, the greater the difference in the expansion of the two metals, to thereby cause the formation of a tighter seal. Thus, as the temperature difference increases, the sealing effect of the bi-metallic seal of the present invention also increases.

In the preferred embodiment, the bi-metal seal is applied to the leading edge of a kiln car to seal against the trailing edge of the next adjacent kiln car as the cars are pushed through a kiln tunnel. In this manner, the flow of air and heat within a kiln is prevented from passing between adjacent cars. In a modification of the present invention, the bi-metallic seal can be applied about building construction members, such as windows and doors, to provide a positive and relatively inexpensive seal for the building openings. In this embodiment, a suitable bi-metallic element is employed which is responsive to a decrease in temperature to flex the free end of the seal outwardly toward the adjacent member. Thus, as the outside temperature becomes colder, a tighter seal between the building construction itself and the window or door unit is thus developed.

It is therefore an object of the present invention to provide an improved bi-metallic seal of the type set forth.

It is another object of the present invention to provide a novel, bi-metallic seal that is fabricated of a combination of nickel and chromium in elongate strip configuration.

It is another object of the present invention to provide a novel bi-metallic seal that is elongated in configuration to seal a junction between adjacent surfaces, the seal having one elongated edge which is affixed to one of the surfaces and another elongated edge which is free to flex and seal against the other said surface.

It is another object of the present invention to provide a novel bi-metallic seal of combination nickel and chromium comprising an elongate strip, the said strip being generally V-shaped in cross sectional configuration.

It is another object of the present invention to provide a novel bi-metallic strip of elongate configuration, the said strip being comprised of a nickel-chromium bonded construction, the said strip having an elongated affixed edge, an elongated intermediate body portion and an elongated free sealing edge.

It is another object of the present invention to provide a novel bi-metallic seal that is inexpensive in manufacture, highly efficient in operation and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
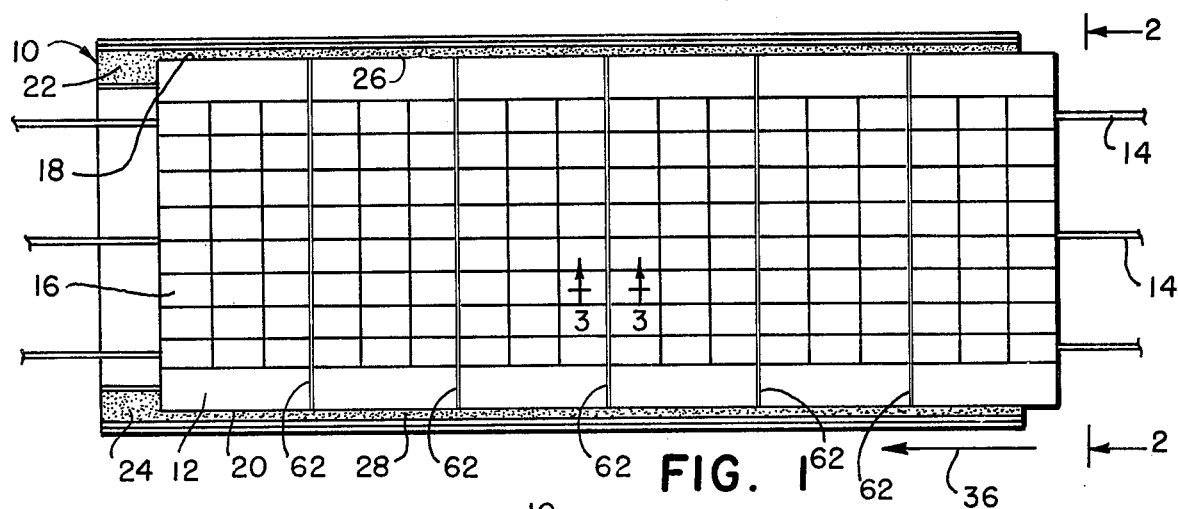
FIG. 1 is a schematic, top plan view of a kiln tunnel with a plurality of kiln cars positioned therewithin.

Although specific terms are used in the following description for the sake of clarity, these terms are intended to refer only to the particular structure of my invention selected for illustration in the drawings and are not intended to define or limit the scope of the invention.

Figure 2:
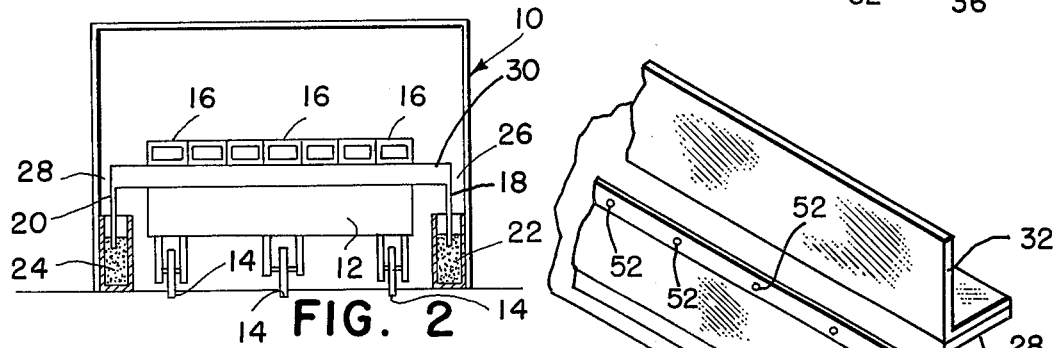
FIG. 2 is an end elevational view of the kiln tunnel looking from Line 2—2 of FIG. 1.

Referring now to the drawings, I show in FIGS. 1 and 2 a schematic representation of a conventional kiln tunnel 10 wherein kiln cars 12 are pushed along longitudinally extending rails 14 for the purpose of firing ceramic products, for example, construction blocks 16. Conventionally, the transverse edges 18, 20 of each kiln car 12 longitudinally ride within the transversely spaced sand troughs 22, 24 to seal the transverse spaces 26, 28 between each kiln car 12 and the adjacent tunnel wall to thereby prevent the flow of air and heat thereabout. The present invention is concerned with sealing the transverse junctions 26 between adjacent kiln cars 12 to prevent the passage of air and heat therethrough.

Figure 4:
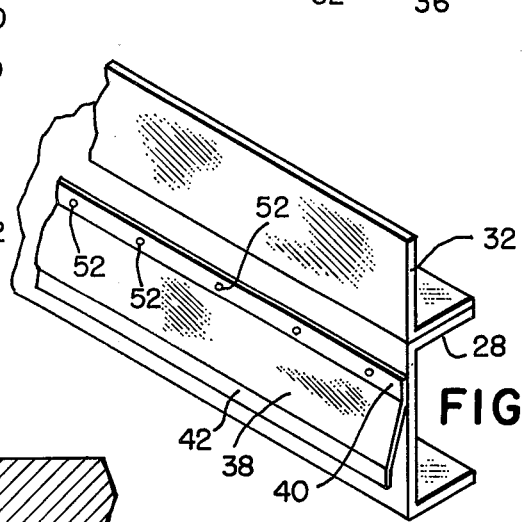
FIG. 4 is an enlarged, partial, perspective view of the bi-metallic strip applied to the leading edge of a kiln car.
Figure 3:
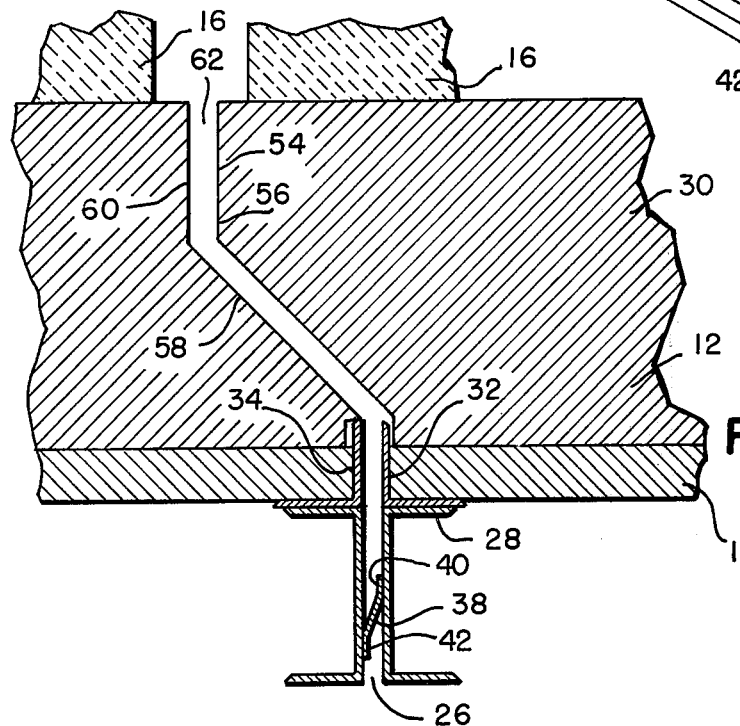
FIG. 3 is an enlarged, partial, cross sectional view taken along line 3—3 of FIG. 1, looking in the direction of the arrows.

As best seen in FIGS. 3 and 4, each kiln car 12 is fabricated with a structural steel frame 28 upon which a refractory layer 30 is placed to prevent direct impingement of heat from the kiln tunnel upon the steel structural members. Each kiln car 12 is fabricated with a front bumper 32 and a rear bumber 34 which horizontally align to form the transverse junctions 26 as the cars 12 are pushed through the kiln tunnel 10 in the direction of the arrow 36.

Figure 5:
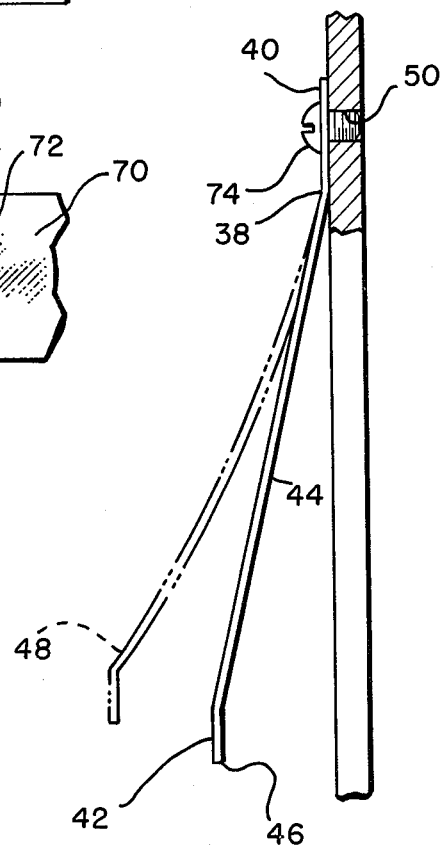
FIG. 5 is an enlarged, side elevational view of the bi-metallic seal strip in initial condition, the condition of the seal strip under temperature differential conditions being illustrated in dotted lines.

The bi-metallic seal 38 of the present invention comprises an elongated strip comprising two metals which are molecularly bonded together, for example, nickel and chromium. The seal 38 of the present invention extends transversely across the entire width of each car 12 and is secured to the front bumper 32 of each car 12 in a manner to seal against the rear bumper 34 of the next forwardly positioned kiln car 12 when the cars are within the kiln tunnel 10. The bi-metallic seal 38 constructed in accordance with the teachings of the present invention has been fabricated to a total cross sectional thickness of approximately 0.020 inch and has an overall, projected height of approximately two and one-quarter inches. The seal 38 is generally Z-shaped in cross sectional configuration and includes an upper fixed edge 40, a lower sealing edge 42 and an intermediate body section 44. Preferably, the fixed edge and the sealing edge 40, 42 are formed in parallel, spaced planes which are generally parallel to the vertical faces of the front and rear bumpers 32, 34. The body section 44 is angularly inclined relative to the front and rear bumpers 32, 34 in all positions between the initial, unflexed position 46 which is shown in full lines in FIG. 5 to the sealing position 48 which is illustrated in dotted lines in FIG. 5.

In order to install the sealing strip 38, the fixed edge 40 is provided with a plurality of transversely spaced fastener receiving openings 50 and the front bumper 32 is provided with a plurality of aligned, conventionally drilled and capped openings (not shown) which align with the fastener and receiving openings 50 in the bi-metallic strip 38. A plurality of number ten drive screws 52 conventionally threadedly affix the bi-metallic strip 38 to the front bumper 32.

As best seen in FIG. 3, the leading edge 54 of the refractory layer 30 of each car is formed to project forwardly of the front bumper 32 to protect the steel of the bumper from direct impingement of heat from within the kiln tunnel. The leading edge 54 is configured to provide an overhanging ledge 56 which forwardly projects over the steel construction of the bumper 32 for heat shielding purposes. The trailing edge 58 of the refractory 30 of each kiln car 12 is formed with a transverse recess 60 which is positioned forwardly of the rear bumper 34 and which is configured to receive therein the leading edge 54 of the next rearwardly positioned kiln car 12. It will be noted that a transverse junction 62 is provided between adjacent kiln cars 12 which is positioned forwardly of the transverse junction 26 between the respective structural steel front and rear bumpers 32, 34 to thereby prevent direct impingement of the kiln heat upon the structural steel car frames. The overhanging ledge 56 and the transverse recess 60 are shown with portions disposed approximately at 90° and at approximately 45° from the horizontal for purposes of illustration only. It will be appreciated that the configuration of the leading edge 54 and the trailing edge 58 may be of any desired configuration so long as the refractory layers 30 of the forward and trailing kiln cars 12 interlock to position the transverse junction 62 out of registry with the lower position transverse junction 62 between the adjacent bumpers 32, 34.

The metallic elements chosen to form the bi-metal seal 38 should have coefficients of expansion which are adequately different to permit flexure of the sealing edge 42 a sufficient distance between its initial position 46 and the sealing position 48 to close the longitudinal distance at the transverse junctions 26. The nickel/chromium embodiment mentioned has been found to flex more than one-half inch between the initial position 46 and the sealing position at 500° temperature differential for transverse junction sealing purposes. Of course, other bi-metallic seal strips of suitable characteristics can be employed and fall within the scope of this invention. The bi-metallic seal sold under the trademark "Heatsetz" by Harr Brothers Yamaha Co., Inc., Trenton, N.J., has been found suitable for this purpose. It has been found that with an elongated bi-metallic Heatsetz nickel/chromium seal strip, with an approximate projected height of two and one-quarter inches, the movement between the initial position 46 and the sealing position 48 will be approximately one half inch at 500°F. and the movement will continue up to approximately 1,000°F.

Figure 6:
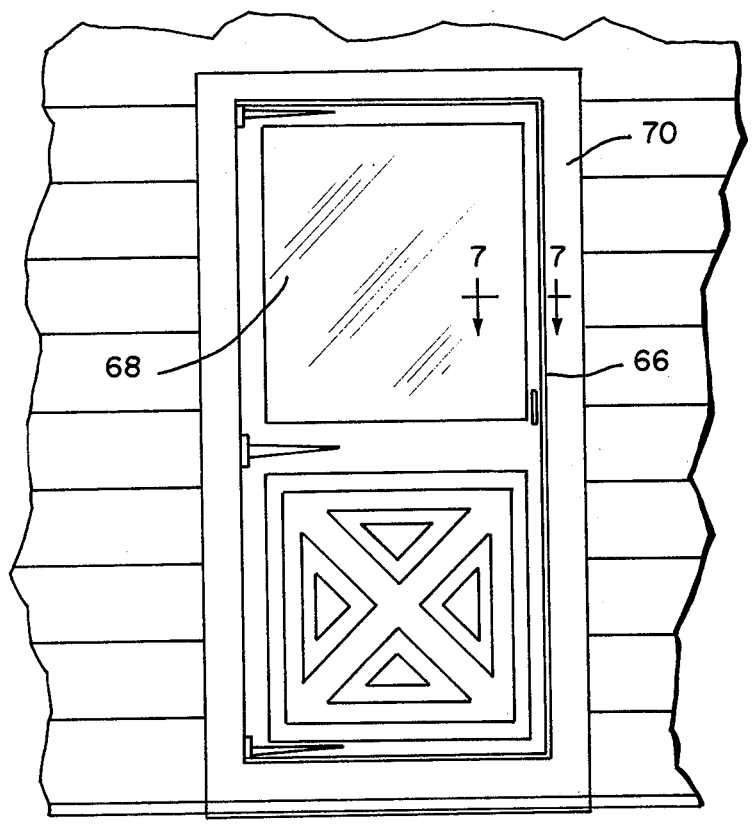
FIG. 6 is a side elevational view of a building opening equipped with a seal strip in accordance with the present invention.
Figure 7:
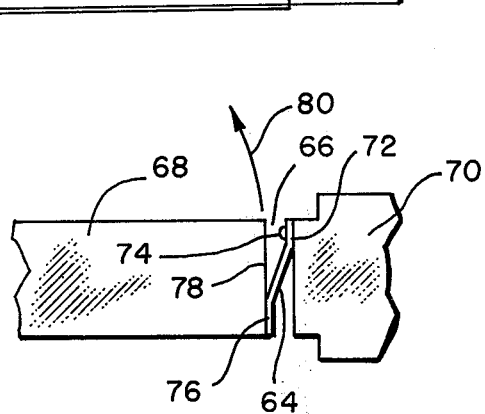
FIG. 7 is an enlarged, cross sectional view taken along Line 7—7 of FIG. 6, looking in the direction of the arrows.

Referring now to FIGS. 6 and 7, I show a modified bi-metallic strip 64 which can be employed to seal the peripheral junction 66 between a building opening member, such as a door 68, and the peripheral construction 70, such as framing which defines a building opening, for example, a door opening or a window opening. In this instance, the fixed edge 72 of the modified bi-metal strip 64 is affixed to the stationary, peripheral construction 70 by means of fasteners such as wood screws 74 to thereby leave an unsecured edge 76 which is free to move relative to the peripheral construction 70 upon change in outside air temperature. In this embodiment, the metal employed in the modified bi-metallic strip 64 should be suitable to move the free end 76 away from the stationary peripheral construction 70 as the outside temperature decreases. Accordingly, as it grows colder outside, the free edge 76 will be urged more tightly against the peripheral edge 78 to thereby provide a tighter seal against the door 68 or window (not shown). It will be noted that the modified strip 64 is configured similarly to the strip 38 and is generally Z-shaped in cross sectional configuration to facilitate opening and closing of the door 68. Thus, the door 68 will open in the direction indicated by the arrow 80 in FIG. 7 to thereby slide relative to the free edge 76 and avoid all contact with the fixed edge 72.

Although I have described the present invention with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a seal between adjacent first and second members, the combination of
   A. a bi-metallic sealing strip of elongate construction,
      1. said strip having one elongated fixed edge and one elongated sealing edge,
         a. said free edge having an initial position,
      2. said fixed edge being affixed to the first member,
      3. said sealing edge flexing outwardly from the initial position when the members are subjected temperature differential,
      4. said sealing edge assuming a final position against the second member when the members are subjected to the temperature differential to thereby establish the seal; and
   B. a first member comprising the rear bumper of a kiln car and the second member comprises the front bumper of a kiln car,
      1. the front and rear bumpers being in horizontal alignment to define a transverse junction.

2. The invention of claim 1 wherein each kiln car is provided with a refractory shield positioned above the bumpers, the refractory shield overhanging the front bumper in an overhanging ledge.

3. The invention of claim 1 wherein the refractory shield terminates forwardly of the rear bumper to provide a transverse recess.

4. The invention of claim 3 wherein the overhanging ledge and the transverse recess are cooperatively shaped to form a second transverse junction when the first and second members are urged together, the second junction being longitudinally offset from the first junction.

* * * * *